UNITED STATES PATENT OFFICE.

FRITZ GÖSSEL, OF STOCKHEIM, GERMANY.

PROCESS OF MANUFACTURING ALIMENTARY PRODUCTS FROM SOY-BEANS.

1,082,118. Specification of Letters Patent. Patented Dec. 23, 1913.

No Drawing. Application filed November 7, 1912. Serial No. 729,985.

*To all whom it may concern:*

Be it known that I, FRITZ GÖSSEL, a subject of the Emperor of Germany, and resident at Stockheim, Hesse, Germany, have invented certain new and useful Improvements in Processes of Manufacturing Alimentary Products from Soy-Beans or Similar Vegetable Seeds.

This invention relates to an improved process of producing a new alimentary substance, the composition and nature of which are similar to milk, from vegetable materials, such as soy-beans or other similar seeds, pistachio-nuts, teel-seeds and the like, or mixtures of such seeds. It is well known that these seeds contain large proportions of albumin, fat and carbohydrates, and that soy-beans are particularly rich in albumin similar to the casein contained in milk. Soy-beans not only contain casein-like albumin but also albumin-like compounds of albumin. These alimentary substances and particularly the albuminous materials are extracted and utilized for alimentary purposes by the present process, which provides furthermore means for improving the taste of the substances produced.

It is well known that soy-beans as well as other similar seeds are uneatable in a raw state, and the taste thereof, particularly of soy-beans, is not improved by boiling them in water for a long time. Long boiling of soy-beans with water alone renders insoluble the albumin-like proteid combinations, which would otherwise be soluble and which, particularly in the case of soy-beans, are important for the production of the new nutrient of the present invention. On the other hand if the seeds referred to are treated with water in a suitable way for the extraction of their nutritive components, a milky appearing liquor can be produced, but the composition of such liquor is not at all similar to the composition of milk, as it does not contain similar relative proportions of nutritive substances—albumin, fat and carbohydrates. And it is necessary for the present purposes that the different substances shall be contained in certain proportions in the alimentary product to be made and particularly for the purpose of enabling the albumin to be easily digested. It is well known that the finer the subdivision of albumin when coagulated in the stomach, the easier it will be digested, and the coarser the coagulum, the less completely and the more slowly it will be digested. Now albumin can only be finely coagulated, if it be subdivided by a sufficient quantity of fat. Moreover in order to enable a lactic fermentation of the product similar to that peculiar to cow milk within the digestive tract, it is necessary to directly add milk-sugar or similar carbohydrate to the material which does not itself contain a sufficient quantity of carbohydrates. And in order to enable the new product to be used with coffee, tea and the like tannic acid-containing substances without the albumin being coagulated by the latter, the new product remaining in a state like that of cow milk, it is necessary to add small quantities of carbonate of sodium or bicarbonate of sodium or the like to the said product.

The present process of producing an alimentary product of the nature and composition of cow milk, comprises previously cleaning the seeds (soy-beans, pistachio nuts, teel seeds and the like), grinding the same, mixing the same with water, adding a small quantity of phosphate of sodium or the like, and heating the mixture as quickly as possible to a boiling temperature and continuing the heating for some time, whereupon the boiled mass is suitably strained and pressed after such mass has been somewhat cooled. I then dissolve in the milky liquor so obtained determinate quantities of carbohydrates, such as milk-sugar, and furthermore salts, such as chlorid of sodium, carbonate or bicarbonate of sodium or the like. Thereupon the liquor is emulsified in a suitable manner with determinate quantities of fatty material as, for instance, cocoanut oil, sesame oil, pistachio nut oil or the like; that is, with fat or mixtures of fats or oils which are suitable for human alimentation. Emulsification is continued until the oil is finely divided in the liquor.

The process herein described enables an alimentary product to be produced, whose properties, composition and alimentary qualities will be approximately the same as those of cow mik or other milk and which may be used in the same manner as cow milk, viz., for drinking purposes, for cooking and for baking purposes, for making butter, custards, etc., condensed and dry milk, cheese curd and the like.

For the production of 100 liters of alimentary material, the composition of which corresponds to cow milk of average composition, that is which contains about 3.5 per cent. of fat, 4 per cent. of carbohydrates, 0.6 per cent. of salts, and 3.5 per cent. of albumin, I proceed as follows:—

Example: About 10 kgs. of finely ground soy-beans (or pistachio nuts or teel seeds or mixtures of the same) are mixed with about 100 liters of pure water and a small quantity (about 5 grams) of phosphate of sodium or potassium or the like, and heated as quickly as possible to boiling temperature, and kept just at this temperature for a short time, whereupon the mixture is suitably strained and pressed after it has been cooled to a certain extent. I then dissolve in the liquid about 2.4 kgs. of milk-sugar or other suitable carbohydrate, some chlorid of sodium, and about 60 grams of carbonate of sodium or the like, whereupon the solution is mixed with about 2 kgs. of sesame oil or any other suitable fatty or oily food material. The milky liquor obtained in this way is brought to a volume of 100 liters by the addition of pure water, whereupon suitable flavoring substances may be added to the same.

The milky liquid which is obtained may be treated and used like cow milk or other milk. Milky alimentary preparations of a nature different from that of cow milk may be made. If intended for preservation, it may be pasteurized or sterilized; or it may be condensed or for indefinite keeping. Cream-like, butter-like, custard-like and cheese-like materials may be obtained from this new product by the usual methods employed with cow milk.

What I claim is:—

1. The process of producing an alimentary substance, the properties and composition of which are similar to those of milk, which comprises cleaning seeds rich in albumin, grinding the same, mixing them with water and small quantities of a phosphate of an alkali, heating the mixture to boiling temperature for a short time, cooling the heated mixture, straining and pressing in any suitable manner, dissolving determinate quantities of milk-sugar, chlorid of sodium, and sodium carbonate in the strained liquor, mixing the solution with fatty materials, and finally adding flavoring substances to the product.

2. The process of preparing a milk-like liquid which comprises grinding soy-beans, mixing with water containing an alkaline phosphate, bringing the mixture to a boil, straining and pressing and adjusting the composition of the liquor to that of cow milk by an addition of a carbohydrate, a fatty material and suitable salts.

3. The process of preparing a milk-like liquid which comprises grinding soy-beans, mixing with water containing an alkaline phosphate, bringing the mixture to a boil, straining and pressing and adjusting the composition of the liquor to that of a natural milk by an addition of milk sugar, an oily material and suitable salts.

4. The process of preparing a milk-like liquid which comprises grinding soy-beans, mixing with water containing an alkaline phosphate, bringing the mixture to a boil, straining and pressing and adding to the liquor about 2 parts of milk sugar and about 2 parts of an oil for each 10 parts of seed treated.

5. The process of preparing a milk-like liquid which comprises grinding soy-beans, mixing with water containing an alkaline phosphate, bringing the mixture to a boil, straining and pressing and adding to the liquor about 2 parts of milk sugar, about 2 parts of an oil and about 0.1 part of salts for each 10 parts of seed treated.

In testimony whereof I have hereunto set my hand in presence of two witnesses.

FRITZ GÖSSEL.

Witnesses:
 LEOPOL HARRIS,
 JEAN GRUND.